United States Patent [19]
van den Brink et al.

[11] Patent Number: 5,352,422
[45] Date of Patent: Oct. 4, 1994

[54] PROCESS FOR THE SELECTIVE OXIDATION OF SULPHUR COMPOUNDS TO ELEMENTAL SULPHUR

[75] Inventors: Peter J. van den Brink; John W. Geus, both of Utrecht, Netherlands

[73] Assignees: VEG-Gasinstituut N.V., Amsterdan; Comprimo B.V., Apeldoorn, both of Netherlands

[21] Appl. No.: 23,607

[22] Filed: Feb. 26, 1993

Related U.S. Application Data

[62] Division of Ser. No. 555,254, Jul. 19, 1990, Pat. No. 5,286,697.

[30] Foreign Application Priority Data

Jul. 21, 1989 [NL] Netherlands .......................... 8901893
Oct. 31, 1989 [NL] Netherlands .......................... 8902690

[51] Int. Cl.$^5$ ...................... C01B 17/16; C01B 17/02
[52] U.S. Cl. .................... 423/224; 423/230; 423/576.8
[58] Field of Search ............... 423/231, 247, 230, 514, 423/576, 578, 224; 502/514, 258, 313, 316

[56] References Cited

U.S. PATENT DOCUMENTS

| | | | |
|---|---|---|---|
| 3,284,369 | 11/1966 | Bergna et al. | 252/454 |
| 4,192,857 | 3/1980 | Tellier et al. | 423/576 |
| 4,197,277 | 4/1980 | Sugier et al. | 423/231 |
| 4,224,189 | 9/1980 | Scholten et al. | 252/458 |
| 4,225,464 | 9/1980 | Scholten et al. | 252/458 |
| 4,311,683 | 1/1982 | Hass et al. | 423/573 |
| 4,444,742 | 4/1984 | Hass et al. | 423/573 |
| 4,472,516 | 9/1984 | Frenken et al. | 502/60 |
| 4,520,127 | 5/1985 | Otake et al. | 502/209 |
| 4,711,773 | 12/1987 | Mesters et al. | 423/655 |
| 4,818,740 | 4/1989 | Berben et al. | 502/313 |

FOREIGN PATENT DOCUMENTS

| | | |
|---|---|---|
| 0071983 | 8/1982 | European Pat. Off. . |
| 0078690 | 11/1982 | European Pat. Off. . |
| 0091551 | 2/1983 | European Pat. Off. . |
| 1450550 | 5/1965 | France . |
| 2340763 | 9/1977 | France . |
| 2481254 | 10/1981 | France . |
| 1400494 | 12/1981 | U.S.S.R. . |

OTHER PUBLICATIONS

Paper for publication by P. J. van den Brink et al., "Selective Oxidation of Hydrogen Sulfide to Elemental Sulfur on Supported Iron Sulfate Catalysts" to be published.
Brunauer et al., J. Am. Chem. Soc. 60:(30g) pp. 309–319, Feb. 1938.
Hurst et al., Catal. Rev.-Sci. Eng. 24(2), pp. 233–309 (1982).

*Primary Examiner*—Gary P. Straub
*Attorney, Agent, or Firm*—Weingarten, Schurgin, Gagnebin & Hayes

[57] ABSTRACT

The invention is directed to a catalyst for the selective oxidation of sulphur-containing compounds to elemental sulphur, comprising at least one catalytically active material and optionally a carrier, the catalyst having a specific surface area of more than 20 m$^2$/g and an average pore radius of at least 25 Å, while under the reaction conditions the catalyst exhibits no substantial activity towards the Claus reaction.

6 Claims, No Drawings

PROCESS FOR THE SELECTIVE OXIDATION OF SULPHUR COMPOUNDS TO ELEMENTAL SULPHUR

This application is a division of application Ser. No. 07/555,254, filed Jul. 19, 1990, now U.S. Pat. No. 5,286,697.

The invention relates to a catalyst for the selective oxidation of sulphur compounds, in particular hydrogen sulphide, elemental sulphur, a process for preparing such a catalyst, and a method for the selective oxidation of hydrogen sulphide to elemental sulphur.

The necessity of purifying gases which are further treated in chemical processes, supplied to buyers, or discharged to the atmosphere, from sulphur compounds, in particular hydrogen sulphide, is generally known. Accordingly, a number of processes are known which are directed to the removal of hydrogen sulphide from gas.

One of the best-known methods of converting hydrogen sulphide to non-harmful elemental sulphur is the so-called Claus process.

In the Claus process, however, the $H_2S$ is not quantitatively converted to elemental sulphur, mainly due to the fact that the Claus reaction is not completed:

$$2H_2S + SO_2 \rightarrow 2H_2O + 3/nS_n \tag{1}$$

A residual amount of $H_2O$ and $SO_2$ remains. Now, generally it is not allowed to discharge $H_2S$ containing residual gas, and so the gas is to be combusted, with the hydrogen sulphide and other sulphur compounds as well as the elemental sulphur present in the gaseous phase being oxidized to sulphur dioxide. With the environmental requirements becoming stricter, this will not be allowed anymore because the sulphur dioxide emission involved is too high. It is therefore necessary to further treat the residual gas of the Claus installation, the so-called tail gas, in a so-called tail gas installation.

Tail gas processes are known to those skilled in the art. The best-known and to date most effective process for the treatment of tail gas is the SCOT process (See GB-A-1,461,070). In this process the tail gas, together with hydrogen, is passed over a cobalt oxide/molybdenum oxide catalyst applied to $Al_2O_3$ as a carrier, the $SO_2$ present thus being catalytically reduced to $H_2S$. The total amount of $H_2S$ is then separated in conventional manner by liquid absorption. One drawback of the SCOT process is that it requires a complicated installation. Another drawback is the high energy consumption involved in removing the hydrogen sulphide from the absorbent again.

Another possibility of converting hydrogen sulphide in tail gas to elemental sulphur is the so-called BSR Selectox process, described in U.S. Pat. No. 4,311,683. According to this process the $H_2S$ containing gas, mixed with oxygen, is passed over a catalyst containing vanadium oxides and vanadium sulphides on a non-alkaline, porous, refractory oxidic carrier.

An important drawback of both the SCOT process and the Selectox process is that in both cases the tail gas, after hydrogenation of the sulphur components present to $H_2S$, must first be cooled for the greater part of the water to be removed, because water greatly interferes with the absorption and the oxidation of $H_2S$. Due to the high investments involved the costs of tail gas treatments according to these known methods are high.

Another process for the oxidation of $H_2S$ to elemental sulphur is disclosed in U.S. Pat. No. 4,197,277. According to this publication the hydrogen sulphide-containing gas is passed with an oxidizing gas over a catalyst which comprises iron oxides and vanadium oxides as active material and aluminum oxide as carrier material. Further the carrier material, which is impregnated with the active material, has a specific surface area larger than 30 m$^2$/g and a pore volume of 0.4–0.8 cm$^3$/g, while at least 12.5% of the total pore volume is constituted by pores having a diameter greater than 300 Å. It has turned out that, with this catalyst, the Claus equilibrium is established at least in part, so that the formation of $SO_2$ cannot be prevented. As a result the effectiveness of this process is insufficient.

The effectiveness with respect to the conversion of $H_2S$ to elemental sulphur can in general be adversely affected by the occurrence of the following side reactions:

1. the continued oxidation of sulphur:

$$1/nS_n + O_2 \rightarrow SO_2 \tag{2}$$

2 the reverse (or rather reversing) Claus reaction:

$$3/nS_n + 2\ H_2O \rightleftharpoons 2H_2S + SO_2 \tag{3}$$

Here the sulphur once formed reacts back with the water vapour also present to form hydrogen sulphide and sulphur dioxide.

The occurrence of the side reactions mentioned above is partly determined by practical conditions.

In general tail gas comprises in addition to elemental sulphur a considerable amount of water vapour, which amount may be within the range of 10–40% by volume. The water vapour strongly promotes the reversing Claus reaction. The substantial removal of water vapour has evident technical disadvantages, such as the necessity of an additional cooling/heating stage, an additional sulphur recovery stage or a hydrogenation stage followed by a water-removing quench stage. A process in which the conversion to elemental sulphur is not influenced by the water content of the feed stock gas is therefore desirable.

Another important circumstance is that in general in the selective oxidation some excess of oxygen will be used not only to prevent the $H_2S$ from "slipping through" but also on the ground of considerations of control technology. This very excess of oxygen, however, may give rise to the continued oxidation of the elemental sulphur formed, thus adversely affecting the effectiveness of the process.

U.S. Pat. No. 4,818,740 discloses a catalyst for the selective oxidation of $H_2S$ to elemental sulphur, the use of which prevents the side reactions mentioned to a large extent, while the main reaction $$H_2S + \tfrac{1}{2}O_2 \rightarrow H_2O + 1/nS_n \tag{4}$$

takes place with a sufficient degree of conversion and selectivity.

The catalyst according to U.S. Pat. No. 4,818,740 comprises a carrier of which the surface exposed to the gaseous phase does not exhibit alkaline properties under the reaction conditions, and a catalytically active material is applied to this surface. Further the specific surface area of the catalyst is less than 20 m$^2$/g and less than 10% of the total pore volume in the catalyst has a pore radius in the range of 5–500 Å.

Although the catalyst constituted a major breakthrough in the field of removing sulphur compounds from gas mixtures, it has turned out that further improvements are desirable and possible.

Due to the limitations imposed upon the specific surface area and the pore radius distribution of the prior catalyst, which limitations play an essential role in realizing the desired results, of necessity a limitation has also been imposed or set the amount of active material which can be applied to the catalyst. As a result the yield of sulphur which can be achieved with the catalyst according to U.S. Pat. No. 4,818,740 is somewhat limited. Because the catalyst described in the patent specification has a relatively high initiating temperature, it is necessary to work at a low space velocity and thus to use a relatively large amount of catalyst, or the final temperature of the gas and the catalyst bed will be so high that the sulphur may be thermally oxidized.

The object of the present invention is to provide a catalyst for the selective oxidation of sulphur compounds to elemental sulphur which has a larger specific surface area, but in which the disadvantages of a larger specific surface area described in U.S. Pat. No. 4,818,740 do not occur.

The invention relates to a catalyst for the selective oxidation of sulphur containing compounds to elemental sulphur, comprising at least one catalytically active material and optionally a carrier, which catalyst has a specific surface area of more than 20 m$^2$/g and an average pore radius of at least 25 Å, while the catalyst under the reaction conditions exhibits substantially no activity towards the Claus reaction.

Surprisingly, we have now found that such a very specific catalyst with a relatively large surface area has a good activity and a good selectivity. Indeed, in view of the disclosure in the above-referenced U.S. Pat. No. 4,818,740 it was to be expected that the activity might be improved, but that the selectivity to elemental sulphur would be substantially lower. It has turned out, however, that the selectivity is very good, provided the abovementioned requirements of pore radius and minimal Claus activity are met.

This last requirement is a very strict requirement, which only a limited number of materials satisfy if the specific surface area exceeds 20 m$^2$/g. In general the materials used in the examples of the abovementioned U.S. Pat. No. 4,818,740 do not satisfy this requirement if the surface area exceeds 20 m$^2$/g. The aluminum oxide mainly used there always comprises an amount of $\gamma$-aluminum oxide which is strongly Clause active in the case of such a specific surface area.

The present invention, therefore, supplies a great need because now it is possible to use a catalyst which has the advantages of the catalyst disclosed in U.S. Pat. No. 4,818,740, while at the same time a large specific surface area can be used. It is particularly surprising that by using the features of the invention, viz. a minimum or zero Claus activity, in combination with an average pore radius of at least 25 Å, a catalyst is obtained which has a good activity and a good selectivity.

One of the advantages of the catalyst according to the invention is that it results in a considerable improvement of the activity per volume unit of catalyst. This has great advantages, especially when the processing capacity of an existing reactor is to be enlarged.

It is noted that in the present invention the absence of Claus activity is defined as the absence of the influence of water on the selectivity of the oxidation reaction of H$_2$S to sulphur in the presence minimally a stoichiometrical amount of O$_2$ at 250° C. More particularly this means that in the presence of 30% by volume of water the selectivity of the reaction to elemental sulphur should not be more than 15% lower than the selectivity in the absence of water. This definition of the Claus activity is based on the reversing Claus reaction $$3/nS_n + 2H_2O \rightleftharpoons 2H_2S + SO_2 \qquad (3)$$

If a material is Claus active, the presence of water results in the reaction taking place in the direction of H$_2$S and SO$_2$, with a part of the sulphur being converted to H$_2$S and SO$_2$ again. H$_2$S is then oxidized with the O$_2$ present to sulphur and water vapour, whereafter the Claus active catalyst converts the sulphur back into SO$_2$. Due to the concurrence of these reactions a catalyst with Claus active sites will in the presence of water give rise to a strong decrease in selectivity.

Within the scope of the invention "specific surface area" means the BET surface area as defined by S. Brunauer et al., in J. A. C. S. 60, 309 (1938). A nitrogen adsorption was used at 77 K according to the so-called three-point measurement. In the calculation the surface area of a nitrogen molecule was set at 16.2 Å$^2$.

The average pore radius is determined starting from a cylindrical pore model while using the following formula:

$$\text{Average pore radius (Å)} = \frac{20{,}000 \times \text{pore volume (cm3/g)}}{\text{BET surface area (m2/g)}}$$

The pore volume used in this formula is gravimetrically determined by impregnation with water in vacuo. The specific pore volume can also be determined using mercury porosimetry up to a pressure of 2000 bar. The values obtained by the two methods show a good correspondence.

The specific surface area of the catalyst according to the invention can, in contrast with the teachings of U.S. Pat. No. 4,818,740, be considerably higher than the upper limit according to this U.S. patent specification. More specifically, the specific surface area is at least 25 m$^2$/g, since a good activity can be obtained with such values.

Preferably, the specific surface area of the catalyst will not be larger than 300 m$^2$/g of catalyst. In general no specific additional advantages are gained with higher values.

The requirement as regards the average pore radius is relevant in view of the nature of the reaction. If there are too many small pores there is the risk of continued oxidation of sulphur to SO$_2$ as a result of the sulphur remaining in the pores too long, which is undesirable. However, the optimum pore radius also depends on the size of the catalyst particles. According to the invention a pore radius of at least 25 Å is required. Such a pore radius can be used in particular in situations where the size of the catalyst particles is fairly small. Examples of such situations are the use of a powdered catalyst in a fluidized bed of catalyst having a particle size in the range of 10 μm-1 mm, or the use of a catalyst which has been applied as a thin layer to a carrier material, for instance of a sinter metal or a honeycomb. In such situations in general a maximum pore radius of 150 Å is used. In such cases the pore length can advantageously be kept small, for instance below a maximum of 100 μ m.

According to another embodiment of the invention the catalyst consist of particles, such as tablets, extrusions or pellets having a diameter in the range of 1/32-½ inch. Such catalysts are preferably used in fixed bed reactors, where the size of the particles is an important factor in influencing the pressure drop across the reactor. With this embodiment of the catalyst according to the invention optimum results are obtained using a pore radius of at least 150 Å.

The average pore radius is in general preferably at least 50 Å because of the desired selectivity, more specifically at least 200 Å and when relatively large catalyst particles are used at least 325 Å, while 2000 Å is an upper limit. In general no additional advantage is no be gained above this limit, while on the other hand problems may arise in the preparation of the carrier. More specifically an average pore radius not exceeding 500 Å is preferred.

The catalyst according to the invention generally comprises 0.1-100% by weight, calculated on the total mass of the catalyst, of a material which is catalytically active for the selective oxidation of $H_2S$ to elemental sulphur.

It should be stressed that we are here concerned with the active material which is accessible to the reaction gases. Indeed, by sintering or by a different process of preparation a part of the active material, in particular metal oxide, can also be encapsulated, for instance by sintering up narrow pores in the carrier. However, the difference between encapsulated metal oxide and metal oxide present on the carrier can easily be determined by TPR, temperature programmed reduction. Details of this measuring technique are described in N. W. Hurst, S. J. Gentry, A. Jones and B. D. McNicol, Catal. Rev. Sci. Eng., 24 (2), 233-309 (1982).The amount of metal oxide that is present and accessible to gases can thus be determined.

As an effective catalytically active material a metal compound is used, or a mixture of metal compounds, optionally in combination with one or more compounds of non-metals.

As catalytically active material preferably an iron compound or a compound of iron and chromium is used. Effectively a molar ratio of Cr:Fe is chosen which is lower than 0.5 and preferably in the range of 0.02-0.3.

The catalyst according to the invention may contain one or more promoting materials. Suitable promoting materials according to the invention are phosphorus compounds. These can be applied to the catalyst inter alia by impregnation with a soluble phosphorus compound.

Generally the catalyst will comprise a carrier material no which a catalytically active material is applied. It is also possible, however, to produce a catalyst which comprises no separate carrier material, but whose total mass basically consists of catalytically active material. It is preferred, however, to use a carrier material to which a catalytically active material has been applied.

The active component is present on the carrier in an amount preferably in the range of 0.1-40% by weight, more preferably 0.1-10% by weight calculated on the total weight of the catalyst.

Generally as a carrier a ceramic material is used, which under the reaction conditions exhibits no Claus activity or has been deactivated as regards this activity. It is also possible, however, to use as a carrier other materials which exhibit no or hardly any Claus activity, satisfy the requirement regarding the average pore radius and are thermostable. Examples are thermostable non-ceramic materials, such as metal gauze structures and surfaces of (incompletely) sintered materials. Very suitable is a honeycomb structure having a high thermal conductivity. Suitable materials for such carriers are the various metal alloys which are stable under the reaction conditions. Examples are metals such as Fe, Cr or Ni or alloys which comprise one or more of these metals.

Using sinter metals or honeycomb structures as construction material in a reactor, or as carrier material, is advantageous in that it enables the efficient control of heat in the reactor. The point is such materials permit easy transfer of heat, which makes it possible to supply and/or to disperse a lot of heat. Preferably the catalyst is applied to the metal in a thin layer. One can apply only the catalytically active material or the catalytically active material together with a carrier material. In the latter case preferably a thin layer of catalyst will be applied. Then the catalyst will preferably have a relatively small pore radius in order that sufficient active surface area is obtained. The specific surface area of the catalyst will then preferably exceed 100 $m^2/g$. In such a case preferably a catalyst is used with relatively short pores, the pore length being for instance less than 100 $\mu$m.

As explained hereinbefore aluminum oxide as such is generally less suitable as a carrier. It turns out, however, that silicon dioxide, whose pore radius and specific surface area meet the requirements set, yields good results when it is used as a carrier and its use is therefore preferred.

In principle the catalysts according to the invention can be prepared by the known methods of preparing (supported) catalysts.

The non-supported catalysts are preferably prepared by (co)precipitation of the active component or components. When more than one active component is used these components may optionally be precipitated consecutively. In the preparation the conditions should be chosen such that a material is obtained which has the desired structure and properties or can be converted into such a material.

Since preferably a catalyst is used with a carrier material it is preferred to start from a carrier which itself already has a suitable average pore radius and exhibits no or only minimum Claus activity.

In order to bring the catalyst carrier into a suitable form, it may optionally be subjected to a sintering treatment beforehand.

If desired, a sintering treatment may be carried out with a finished catalyst, micropores thus being sintered up.

In the preparation of supported catalysts the homogeneous application of the catalytically active material to the carrier material requires particular care, and furthermore it is to be ensured that homogeneity is maintained during and after the drying and calcination procedure.

For these requirements to be met it is very effective to prepare such catalysts by the "dry" impregnation of the carrier material with a solution of a precursor of the active component or components. This method is known as the so-called incipient wetness method. Good results are obtained with a solution of an EDTA complex. An amount of a viscosity increasing compound such as hydroxyethyl cellulose may be added to the solution. By impregnating the carrier material with this solution by means of the incipient wetness method, a catalyst is obtained to which the active material is applied very homogeneously.

The invention also relates to a process for the selective oxidation of sulphur containing compounds, in particular hydrogen sulphide, to elemental sulphur, using the catalyst according to the invention.

According to this process hydrogen sulphide is directly oxidized to elemental sulphur by passing a hydrogen sulphide containing gas together with an oxygen containing gas over the catalyst at an elevated temperature.

It is noted that not just the structure of the catalyst, but also the process parameters determine whether optimum results are obtained. The selected temperature and the contacting time for the oxidation are of particular relevance. The use of the present catalyst, for that matter, permits tolerating an excess of oxygen and/or the presence of water in the gas to be treated.

The oxidation process is carried out by adding such an amount of oxygen or an oxygen containing gas to the hydrogen sulphide containing gas, using a known per se ratio regulator that the molar ratio of oxygen to hydrogen sulphide is between 0.5 and 5.0, and preferably between 0.5 and 1.5.

The process according to the invention can be used for the selective oxidation of all gases which comprise sulphur containing compounds, in particular hydrogen sulphide. Examples of processes in which the oxidation according to the invention can be suitably used are the processes described in European patent application 91551, European patent application 78690 and U.S. Pat. No. 4,311,683.

The process according to the invention is eminently suitable for oxidizing gas which does not contain more than 1.5% of $H_2S$, because then a normal, adiabatically operating reactor can be used.

In the oxidation the inlet temperature of the catalyst bed is selected above 150° C. and preferably above 170° C. This temperature is partly dictated by the requirement that the temperature of the catalyst bed should be above the dew point temperature of the sulphur formed.

If a fixed bed of catalyst particles is used the particles preferably have a diameter in the range of 1/31-½ inch and a pore radius of at least 150 Å. For use in a fixed bed one can also use catalyst particles in the form of rings, pellets, macaroni-like structures, hollow grains and the like. The advantage is that with them a lower pressure drop can be obtained with the same bed height.

If on the other hand a fluidized reactor is used, preferably catalyst particles are used which have a diameter in the range of 10 $\mu$m - 1 mm and a pore radius in the range of 25-150 Å.

One of the advantages of using the invention resides in the fact that a heightened activity is obtained while the selectivity is maintained, which leads to a better sulphur yield. The invention also permits the gas temperature to be initially lower because the catalyst has a lower initiating temperature. Due to the exothermic nature of the oxidation reaction and the fact that at too high a temperature a non-selective thermal oxidation of the sulphur compounds may occur, lowering the initiating temperature is of great importance with a view to increasing the sulphur yield.

By known per se measures the maximum temperature in the catalyst bed is generally maintained below 330° C. and preferably below 300° C.

If the $H_2S$ convene is higher than 1.5% by volume it may be necessary to take steps in order to prevent the temperature in the oxidation reactor from becoming too high due to the reaction heat released. Such steps include for instance the use of a cooled reactor, for instance a tubular reactor, where the catalyst is in a tube which is surrounded by a coolant. Such a reactor is known from European patent specification 91551. A reactor containing a cooling element may also be employed. Further, it is possible to return the treated gas to the reactor inlet after cooling, and thus an additional dilution of the gas to be oxidized is attained or, alternatively, the gas to be oxidized can be distributed over a plurality of oxidation reactors while simultaneously the oxidation air is distributed over the various reactors.

According to a particular embodiment of the process according to the invention the catalyst is employed as a fluid medium in a fluidized bed reactor. Thus an optimum heat transfer can be achieved.

According no another particular embodiment the catalyst is utilized in the form of fixed, for instance honeycomb-like, structures of high thermal conductivity, which also suitably prevents an undesirable increase in the temperature of the catalyst.

The process according to the invention can be utilized with particular advantage for the selective oxidation of the hydrogen sulphide containing residual gases coming from a Claus plant. Apart from the very high selectivity of the catalyst according to the invention a very important additional advantage is thus obtained in that the removal of water prior to the oxidation is no longer required. If the process according to the invention is used to oxidize the residual gases referred to, these gasses are preferably first passed through a hydrogenation reactor, in which for instance a cobalt-molybdenum containing catalyst is present and in which all sulphur containing compounds are hydrogenated to hydrogen sulphide.

According to a variant of the process according to the invention the selective oxidation stage in which the catalyst according to the invention is used is combined with a subsequent hydrogenation on stage, followed by absorption of hydrogen sulphide, as described in European patent application 71983. 98% of the sulphur compounds present are thus removed in the part preceding hydrogenation, so that the hydrogenation stage and the absorption mass are not unduly loaded. In this way sulphur recovery percentages of up to 100% can be achieved. According to a variant of this process it is possible after the hydrogenation stage to again employ a selective oxidation according to the invention instead of the absorption mass, a total sulphur recovery percentage between 99.5 and 99.8% being thus attained.

Further the process according to the invention is particularly suitable for desulphurizing for instance fuel gases, refinery gases, bio gas, coke furnace gas, gaseous effluents from chemical plants such as viscose factories, or gasses which are flared at gas and/or oil extraction sites.

If in the process according to the invention the sulphur vapour containing gas coming from the selective oxidation stage, optionally after condensation and separation of the greater part of the sulphur, is passed over a bed in which the sulphur is removed by capillary adsorption, the sulphur recovery percentage is increased to virtually 100%.

The invention is illustrated in and by the following examples. The values for BET surface area and average pore radius specified in them have been determined in the manner defined hereinbefore.

EXAMPLES

Example 1a 100 g of silica (Degussa OX-50, B. E. T. 42 m²/g) were mixed with 147 g of water and 1.5 g of HEC (Hydroxy Ethylene Cellulose) and extruded. The extrusions were dried at 100° C. In order to obtain sufficient mechanical strength the extrusions were calcined at 700° C. The preformed carrier thus obtained had a BET surface area of 45.5 m²/g, a pore volume of 0.8 cm³/g and an average pore radius of 350 Å.

Example 1b 0.44 g of EDTA (ethylene diamine tetraacetic acid) was dissolved in 10% $NH_3$ to form a solution having a pH of 7. Then 0.52 g of $Cr(NO_3)_3 \cdot 9\ H_2O$ and 2.05 g of $NH_3FeEDTA \cdot 1.5\ H_2O$ were added to this solution. The slurry thus obtained was adjusted to a pH of 6 with 25% $NH_3$ and made up with demineralized water to a total of 8 ml. The result was a red solution.

10 g of the extrusions obtained according to Example 1a were then impregnated with the 8 ml solution. They were then dried for 5 hours at room temperature and for 5 hours at 120° C. By heating the dried sample at 500° C. in air for 5 hours an iron oxide-chromium oxide phase was generated. The catalyst obtained in this way had a BET surface area of 45.9 m²/g, a pore volume of 0.75 cm³/g and an average pore radius of 325 Å. The iron oxide content was 4% by weight and the chromium oxide content was 1% by weight, calculated on the weight of the catalyst.

Example 2

2.58 g of $NH_3FeEDTA \cdot 1.5\ H_2O$ were dissolved in 3 ml of demineralized water. The solution was adjusted to a pH of 6 with an ammonia solution (25%). In this solution 0.10 g of diammonium hydrogen phosphate was dissolved. Demineralized water was added to the solution to make a total of 8 ml. The result was a red solution.

10 g of the extrusion obtained according to Example 1a were impregnated with the 8 ml solution. They were dried for 5 hours at room temperature and for another 5 hours at 120° C. By heating the dried sample at 500° C. in air for 5 hours an iron oxide-phosphorus oxide phase was generated. The resultant catalyst had a BET surface area of 40.12 m²/g, a pore volume of 0.72 cm³/g and an average pore radius of 350 Å. The catalyst contained 5% by weight of iron oxide and the phosphorus: iron molar ratio was 1:9.

Examples 3 and 4

From the catalysts prepared in accordance with Examples 1 and 2 sieve fractions were made with a particle size of between 0.4 and 0.6 mm. A quartz reactor tube having a diameter of 8 mm was filled with 1 ml of this catalyst. From the top down a gas mixture of the following molar composition was passed over the catalyst: 4% $O_2$, 1% $H_2S$, 30% $H_2O$ in He. The space velocity (Nml of gas per ml of catalyst per hour) of the gas was 12,000 hr⁻¹. The temperature was raised by steps of 20° C. from 200° C. to 300° C. and then lowered again to 200° C. The sulphur vapour generated was condensed downstream of the reactor at 130° C. The water vapour was removed with a water permeable membrane (Permapure). The composition of the ingoing and the outgoing gas was determined with a gas chromatograph.

The results of the experiments are summarized in Tables 1-3. The tables also present a comparison with a catalyst according to Example 1 of U.S. Pat. No. 4,818,740 (Example A, Table 1).

TABLE 1

| Example | Temp. (bed) °C. | A* | S** | Y*** |
| --- | --- | --- | --- | --- |
| A | 200 | 17 | 97 | 16 |
|  | 220 | 35 | 96 | 34 |
|  | 240 | 54 | 95 | 51 |
|  | 260 | 70 | 95 | 67 |
|  | 280 | 93 | 93 | 86 |
|  | 300 | 99 | 79 | 78 |

*: A = activity (%)
**: S = S selectivity (%)
***: Y = S yield (%)

TABLE 2

| Example | Temp. (bed) °C. | A* | S** | Y*** |
| --- | --- | --- | --- | --- |
| 3 | 200 | 35 | 96 | 34 |
|  | 220 | 73 | 96 | 70 |
|  | 240 | 93 | 94 | 87 |
|  | 260 | 99 | 93 | 92 |
|  | 280 | 100 | 80 | 80 |
|  | 300 | 100 | 64 | 64 |

TABLE 3

| Example | Temp. (bed) °C. | A* | S** | O*** |
| --- | --- | --- | --- | --- |
| 4 | 200 | 36 | 98 | 35 |
|  | 220 | 60 | 97 | 58 |
|  | 240 | 85 | 96 | 82 |
|  | 260 | 99 | 95 | 94 |
|  | 280 | 100 | 82 | 82 |
|  | 300 | 100 | 62 | 62 |

Examples 5 and 6

Low-area $\alpha$-$Al_2O_3$ was made by heating $\gamma$-$Al_2O_3$ extrusions at 1200° C. The specific surface area was 10 m²/g, the pore volume was 0.6 cm³/g and the average pore radius was 1200 Å. Low-area $SiO_2$ was prepared in accordance with Example 1.

Of these carrier materials a sieve fraction was made having a particle size of between 0.4 and 0.6 mm. A quartz mini-reactor tube having a diameter of 8 mm was filled with 1 ml of the carrier material. From the top down a gas mixture of the following composition was passed over this material: 0.5% of $SO_2$, 1% of $H_2S$ in He. The space velocity of the gas was 12,000 hr-1 and the temperature was increased by steps of 20° C. from 200° C. to 300° C. and back again. The sulphur vapour generated was condensed downstream of the reactor at 130° C. The composition of the ingoing and the outgoing gas was determined with a gas chromatograph.

In Table 4 the degree of $H_2S$ conversion (activity) is expressed as a function of the temperature.

TABLE 4

| Temperature (°C.) | Claus activity of | |
| --- | --- | --- |
|  | $SiO_2$ (%) | $\alpha$-$Al_2O_3$ (%) |
| 200 | 10 | 86 |
| 220 | 12 | 83 |
| 240 | 16 | 81 |
| 260 | 23 | 80 |

TABLE 4-continued

| Temperature (°C.) | Claus activity of SiO₂ (%) | α-Al₂O₃ (%) |
|---|---|---|
| 280 | 27 | 79 |
| 300 | 32 | 78 |

Example 7

2.58 g NH₃FeEDTA · 1. 5H₂O was dissolved in 3 ml of demineralized water. The solution was adjusted to pH 6 with an ammonia solution (25%). In this solution 0.10 g of diammonium hydrogen phosphate was dissolved. Demineralized water was added to the solution to make a total of 9.0 ml.

10 g of silicon dioxide extrusions with a specific surface area of 126 m²/g were impregnated with the 9.0 ml solution. They were dried at room temperature for 5 hours and then at 120° C. for another 5 hours. By heating the dried sample in air at 500° C. for 5 hours an iron oxide-phosphorus oxide phase was generated. The catalyst thus formed had a BET surface area of 128.4 m²/g, a pore volume of 0.87 cm³/g and an average pore radius of 140 Å. The catalyst contained 5% by weight of iron oxide and the phosphorus:iron molar ratio was 1:9.

Example 8

2.58 g NH₃FeEDTA· 1. 5H₂O was dissolved in 3 ml of demineralized water. The solution was adjusted to a pH of 6 with an ammonia solution (25%). In this solution 0.10 g of diammonium hydrogen phosphate was dissolved. Demineralized water was added to the solution to make a total of 7.4 ml.

10 g of OX200 (DEGUSSA) with a specific surface area of 180 m²/g were impregnated with the 7.4 ml solution. The material was dried at room temperature for 5 hours and then at 120° C. for another 5 hours. By heating the dried sample in air at 500° C. for 5 hours an iron oxide-phosphorus oxide phase was generated. The catalyst thus formed had a BET surface area of 182 m²/g, a pore volume of 0.71 cm³/g and an average pore radius of 80 Å. The catalyst contained 5% by weight of iron oxide and the phosphorus:iron molar ratio was 1:9.

The catalyst according to Examples 7 and 8 were sieved and of the fraction of 0.4–0.6 mm 1 ml was introduced into a quartz tube having a diameter of 8 mm.

From the top downwards a gas mixture of the following composition was passed over this catalyst: 0.5% of SO₂, 1% of H₂S in He. The space velocity of the gas was 12,000 hr-1 and the temperature was increased by steps of 20° C. from 200° C. to 300° C. and back again. The sulphur vapour formed was condensed downstream of the reactor at 130° C. The composition of the ingoing and the outgoing gas was determined with a gas chromatograph.

In Tables 5 and 6 the degree of H₂S conversion (activity) is expressed as a function of the temperature.

TABLE 5

| Example | Temp. (bed) °C. | A* | S** | Y*** |
|---|---|---|---|---|
| 7 | 200 | 60 | 96 | 58 |
|  | 220 | 82 | 95 | 78 |
|  | 240 | 98 | 93 | 91 |
|  | 260 | 100 | 90 | 90 |
|  | 280 | 100 | 76 | 76 |
|  | 300 | 100 | 50 | 50 |

TABLE 6

| Example | Temp. (bed) °C. | A* | S** | Y*** |
|---|---|---|---|---|
| 8 | 200 | 80 | 94 | 75 |
|  | 220 | 96 | 93 | 89 |
|  | 240 | 100 | 90 | 90 |
|  | 260 | 100 | 76 | 76 |
|  | 280 | 100 | 55 | 55 |
|  | 300 | 100 | 10 | 10 |

Example 9

2.58 g of NH₃FeEDTA · 1. 5H₂O were dissolved in 3 ml of demineralized water. The solution was adjusted to a pH of 6 with an ammonia solution (25%). To this solution 0.071 g of trisodium citrate dihydrate were added and dissolved. Demineralized water was added to the solution to make a total of 8 ml.

10 g of the extrusion obtained according to Example 1a were impregnated with the 8 ml solution. They were dried for 5 hours at room temperature and for another 5 hours at 120° C. By heating the dried sample at 500° C. in air for 5 hours an iron oxide-sodium oxide phase was generated. The resultant catalyst had a BET surface area of 40.12 m²/g, a pore volume of 0.72 cm³/g and an average pore radius of 350 Å. The catalyst contained 5% by weight of iron oxide and the sodium:iron molar ratio was 1:9.

In the same manner as in example 3, the conversion activity and selectivity were determined. This shows the unexpected effect of the addition of alkalimetal to the catalyst according to the invention.

TABLE 7

| Example | Temp. (bed) °C. | A* | S** | Y*** |
|---|---|---|---|---|
| A | 200 | 44 | 99 | 44 |
|  | 220 | 58 | 97 | 57 |
|  | 240 | 80 | 96 | 77 |
|  | 260 | 100 | 94 | 94 |
|  | 280 | 100 | 89 | 89 |
|  | 300 | 100 | 76 | 76 |

*: A = activity (%)
**: S = S selectivity (%)
***: Y = S yield (%)

We claim:

1. A process for treating a tail gas from a Claus process to oxidize hydrogen sulphide to elemental sulphur, characterized by passing said Claus process tail gas together with an oxygen containing gas, at a temperature above 150° C. and below 330° C. over a catalyst comprising at least one catalytically active material and a carrier, the catalyst having a specific surface area of more than 20 m²/g and an average pore radius of at least 50 Å, the catalytically active material being homogeneously dispersed in the carrier, the catalyst characterized by exhibiting no substantial activity towards the Claus reaction (2H₂S+SO₂⇌3/n S$_n$+2H₂O), the definition of no substantial activity towards the Claus reaction being that under reaction conditions for the conversion of hydrogen sulphide to elemental sulphur in the presence of 30% by volume of water at 250° C., the selectivity of the catalyst for the reaction to elemental sulphur is not more than 15% lower than the selectivity of the catalyst in the absence of water.

2. A process according to claim 1, characterized by maintaining the molar ratio of oxygen to hydrogen sulphide in the range of 0.5–1.5.

3. A process according to claim 1, characterized by carrying out the selective oxidation in a fixed bed of catalyst particles having a diameter of 1/32 ½ inch and a pore radius of at least 150 Å.

4. A process according to claim 1, characterized by carrying out said process in a fluidized bed of catalyst particles having a diameter of 10 μm–1 mm and a pore radius of 50–150 Å.

5. A process according to claim 1, wherein said catalytically active material in said catalyst is selected from the group consisting of iron compounds and mixtures of iron and chromium compounds and said carrier in said catalyst consists essentially of silica, the catalytically active material being present in the silica in an amount of 0.1–40% by weight, calculated on the total weight of the catalyst.

6. A process according to claim 1, wherein said catalyst is supported on a sinter metal support or a honeycomb support.

* * * * *

UNITED STATES PATENT AND TRADEMARK OFFICE
CERTIFICATE OF CORRECTION

PATENT NO. : 5,352,422
DATED : October 4, 1994
INVENTOR(S) : Peter J. van den Brink, et al It is certified that error appears in the above-indentified patent and that said Letters Patent is hereby corrected as shown below:

Column 1, line 11, "sulphide, elemental sulphur" should read --sulphide, to elemental sulphur--.

Column 5, line 54, "no which" should read --to which--.

Column 8, line 1, "convene" should read --content---.

Column 8, line 20, "no another" should read --to another--.

Column 11, line 51, "12,000 hr-1" should read --12,000 $hr^{-1}$--.

Column 13, line 3, "1/32 1/2 inch" should read --1/32 -1/2 inch--.

Signed and Sealed this

Twelfth Day of September, 1995

Attest:

BRUCE LEHMAN

*Attesting Officer*          *Commissioner of Patents and Trademarks*